W. H. McCRORY.
PISTON HEAD.
APPLICATION FILED MAR. 10, 1913.
1,079,055.
Patented Nov. 18, 1913.
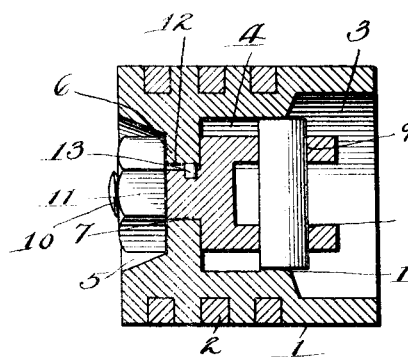
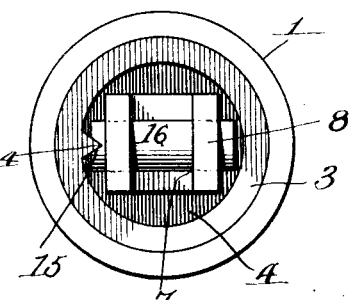
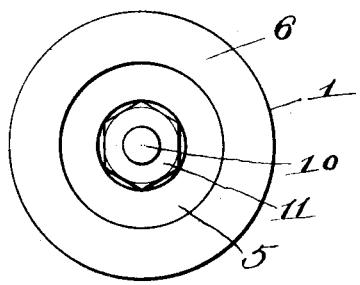
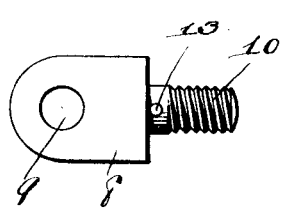
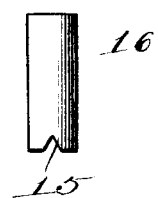
Witnesses
Inventor
W. H. McCrory

UNITED STATES PATENT OFFICE.

WILLIAM H. McCRORY, OF THREE RIVERS, MICHIGAN.

PISTON-HEAD.

1,079,05..  Specification of Letters Patent.  Patented Nov. 18, 1913.

Application filed March 10, 1913. Serial No. 753,399.

*To all whom it may concern:*

Be it known that I, WILLIAM H. McCRORY, a citizen of the United States, residing at Three Rivers, in the county of St. Joseph and State of Michigan, have invented certain new and useful Improvements in Piston-Heads, of which the following is a specification, reference being had therein to the accompanying drawing.

This invention relates to certain new and useful improvements in piston heads and more particularly to the means for connecting the head to the piston rod whereby all danger of the connecting pin working loose is prevented thereby overcoming the difficulties now existing with piston heads in use.

Another object of the invention is to provide a piston head which is so constructed that the connecting pin for the piston rod is arranged within the head so that it is impossible for the pin to become displaced when in position thereby overcoming the difficulties with piston heads now in use, as the pin becomes displaced and injures the cylinder by scoring.

A further object of the invention is to provide means for locking the pin against rotation whereby the connection will be prevented from working loose when in use.

Other and further objects and advantages of the invention will be hereinafter set forth and the novel features thereof defined by the appended claims.

In the drawings—Figure 1, is a longitudinal section through my improved construction of piston head; Fig. 2, is an end view showing the connecting pin; Fig. 3, is an end view showing the connection of the clevis; Fig. 4, is a side elevation of the clevis detached; and Fig. 5, is an elevation of the pin detached.

Like numerals of reference refer to like parts in the several figures of the drawings.

In carrying out my improved invention, I employ a cylindrical head 1 which is provided with annular peripheral grooves in which are mounted piston rings 2 in the ordinary manner; said head being provided with bores 3 and 4 of different diameters in one end thereof, and an annular recess 5 in the outer end of the piston head; the dividing wall 6 being apertured as shown at 7.

For connecting the piston rod not shown, to the head, I employ a yoke 8 or clevis which is provided with registering openings 9 and a threaded shank 10 which is adapted to pass through the opening 7 formed in the division wall 6 and be secured in position by a nut 11 as clearly shown in Figs. 1 and 3. The opening 7 is provided with a longitudinal groove 12 into which fits a pin 13 carried by the shank 10 of the yoke 8 in order to prevent the same from rotating when in position, whereby the clevis is held securely in position within the head in such a manner that the nut is prevented from working loose.

One wall of the bore 4 of the head 1 is provided with a longitudinally arranged rib 14 which is substantially V-shape in cross-section and is adapted to fit within a V-shaped notch 15 formed in the connection pin 16 mounted within the apertures 9 of the clevis so as to relieve the pin 13 of the strain to which it is subjected.

In assembling the piston head, the piston rod is forced in between the arms of the clevis and the pin 16 forced through the apertures thereof. The clevis is then forced into the end of the piston head until the notch 15 engages the rib 14 which prevents the clevis from rotating. At the same time, the pin 13 travels in the groove in order to relieve the strain upon the shank of the clevis and by placing the bolt in position and tightening the same, a connection is formed in which the connecting pin is entirely surrounded by the piston head so that all danger of the cylinder being injured by the connecting pin is prevented.

I claim:

1. A hollow piston head having a clevis arranged within the same, a piston rod connecting pin carried by the clevis, said connecting pin having an interlocking connection with the piston for preventing said clevis and pin from rotating within said piston head.

2. A piston head comprising a cylindrical body having bores of different diameters at one end and a recess at its opposite end forming a partition, said partition being provided with an aperture having a longitudinal groove in its wall, a clevis provided with a shank extending through said aperture, a pin carried by said shank extending into said groove, and a nut mounted on said shank for securing said clevis in position.

3. A piston head comprising a cylindrical body having bores of different diameters at one end and a recess at its other end forming a partition, said partition being provided with an aperture, a rib formed on the wall of one of said bores, a clevis provided with a shank arranged within the aperture of said partition, a nut for securing said clevis in position, and a piston rod connecting pin carried by said clevis having a notched end to receive the rib for preventing rotation thereof.

4. A piston head having bores of different diameters at one end, and a recess at its other end forming a partition, said partition being provided with an aperture having a groove in its wall, a clevis arranged within the bores of said piston having a threaded shank extending through said aperture, a pin carried by said shank extending into said groove, a nut mounted upon said shank within said recess, and a pin carried by said clevis having an interlocking connection with said piston.

5. A piston head comprising a body having a recess at one end and provided with bores of different diameters at its other end, one of said bores being provided with a longitudinal rib substantially V-shape in cross section, a clevis secured within said bore, and a connecting pin carried by said clevis provided with a notched end fitting over said rib.

In testimony whereof I affix my signature in presence of two witnesses.

WILLIAM H. McCRORY.

Witnesses:
　JOHN C. SHOWALTER,
　H. I. WRIGHT.